United States Patent [19]
Mignogna et al.

[11] Patent Number: 5,160,755
[45] Date of Patent: Nov. 3, 1992

[54] CANNED PRODUCT STERILIZING PROCESS

[75] Inventors: Michael S. Mignogna, Medford; Steven Santana, Maple Shade, both of N.J.

[73] Assignee: Campbell Soup Company, Camden, N.J.

[21] Appl. No.: 470,601

[22] Filed: Jan. 26, 1990

[51] Int. Cl.[5] .............................................. A23L 3/04
[52] U.S. Cl. .................................... 426/407; 426/405; 426/406; 426/232; 99/362; 422/307; 422/308
[58] Field of Search ............... 426/399, 401, 405, 406, 426/407, 232; 99/361, 362, 367, 370, 359, 363, 360, 364; 422/307, 308

[56] References Cited

U.S. PATENT DOCUMENTS

| | | |
|---|---|---|
| 865,645 | 9/1907 | Jennings . |
| 1,082,743 | 12/1913 | Gettelman ........................ 99/362 |
| 1,577,219 | 3/1926 | Fooks .............................. 99/362 |
| 1,987,414 | 1/1935 | Omsted ............................ 126/272 |
| 2,025,990 | 12/1935 | Kokemper ........................ 126/272 |
| 3,169,874 | 2/1965 | Birchall . |
| 3,211,275 | 10/1965 | van der Winden . |
| 3,252,405 | 5/1966 | Mencacci .......................... 99/362 |
| 3,286,619 | 6/1966 | Lee .................................. 99/362 |
| 3,377,173 | 4/1968 | van der Winden . |
| 3,407,721 | 10/1968 | Carvallo . |
| 3,418,918 | 12/1968 | Beauvais .......................... 99/362 |
| 3,445,179 | 5/1969 | Jansen . |
| 3,469,988 | 9/1969 | Yawger . |
| 3,473,934 | 10/1969 | Pech . |
| 3,511,168 | 5/1970 | Pech . |
| 3,532,215 | 10/1970 | Davidson . |
| 3,536,225 | 10/1970 | Pech . |
| 3,545,985 | 12/1970 | Mencacci et al. . |
| 3,584,569 | 6/1971 | Kreuzlingen . |
| 3,615,725 | 10/1971 | van der Winden . |
| 3,619,126 | 11/1971 | Carvallo . |
| 3,793,939 | 2/1974 | Wieser et al. . |
| 3,818,818 | 6/1974 | Hice, Sr. . |
| 3,986,832 | 10/1976 | Smorenburg . |
| 4,169,408 | 10/1979 | Mencacci . |
| 4,248,389 | 2/1981 | Thompson et al. . |
| 4,604,948 | 8/1986 | Goldhahn ........................ 99/470 |
| 4,636,366 | 1/1987 | Langen ............................ 422/297 |
| 4,646,629 | 3/1987 | Creed et al. . |
| 4,661,325 | 4/1987 | Noro et al. ...................... 422/304 |
| 4,773,321 | 9/1988 | Wijts . |
| 4,787,300 | 11/1988 | Mette . |

FOREIGN PATENT DOCUMENTS

| | | | |
|---|---|---|---|
| 654468 | 6/1951 | United Kingdom | ............... 426/407 |
| 1147766 | 4/1969 | United Kingdom . | |
| 1173333 | 12/1969 | United Kingdom . | |
| 1277813 | 6/1972 | United Kingdom | ............... 426/407 |

OTHER PUBLICATIONS

Food Science, third edition, N. Potter, AVI Publishing Co., pp. 189-190, 1978.
Complete Course in Canning, Book I, eleventh edition, 1981, pp. 331-349, A. Lopez.
WPIL/Derwent, 89-330018 (45), 1989.
WPIL/Derwent, 84-173916 (28), 1984.
WPIL/Derwent, 87-140229 (20), 1987.
Hunnister, Divided Hydrostatic Sterilizer-Innoplex Novoster, no date.
Continuous Sterilizer Hunninster-Type OHS-750-2-6-Uo-M4-76, no date.
Service and Training Manual, Campbell Soup Company, Operation and Maintenance, A-B Cooker and Cooler, Service Manual 1003, 1968.
Stork Hydromatic Automatic Sterilizing System, no date.

*Primary Examiner*—Steven Weinstein
*Attorney, Agent, or Firm*—Banner, Birch, McKie & Beckett

[57] ABSTRACT

A process and system for sterilizing packages of thermally-treatable products having different sterilization processing requirements. These packaged products can be different types of canned soups, for example. At least one of the packaged products is preheated a significant, predetermined amount in a preheat vessel in a steam or steam-air mixture to accommodate these different processing requirements. This allows the first and second packages to be processed through the stationary hydrostatic sterilizer, which is generally separate from the preheat vessel, at a common line speed and temperature. Expensive sterilizer changeover delays are thereby reduced significantly or even avoided. This process also allows the soup product to be cold blended, reducing the likelihood of any overcooking in the large cooking kettle and reducing the amount of starch needed.

56 Claims, 8 Drawing Sheets

FIG. 13

| TRAJECT ↓ | NUMBER OF CARRIERS |
|---|---|
| A - B | 128 |
| B - C1 | 23 |
| B - C2 | 132 |
| C1 - C3 | 134 |
| C2 - C3 | 25 |
| C3 - D | 14.5 |
| D - E | 285 |
| E - F | 14.5 |
| F - G1 | 25 |
| F - G2 | 134 |
| G2 - H | 23 |
| H - J | 70.5 |
| J - K | 86.5 |
| K - L | 8 |
| L - M | 1471 |
| M - N | 8 |
| N - O | 86.5 |
| O - P | 70.5 |
| P - R | 149 |
| R - S | 16 |
| S - T | 149 |
| T - U | 150 |
| U - V | 150 |
| V - W | 150 |
| W - Y | 150 |
| Y - Z | 150 |
| Z - AA | 150 |
| AA - BB | 150 |
| BB - CC | 150 |
| CC - DD | 150 |
| DD - A | 274 |

CANNED PRODUCT STERILIZING PROCESS

BACKGROUND OF THE INVENTION

The present invention relates to equipment and processes for thermally processing canned food products.

Conventional methods of preserving canned foods after the cans have been filled and closed require that they be subjected to heat treatment for a given period of time. This commercial process provides a sterile product with excellent keeping qualities, and the product can also have nutritive value and organoleptic (color, taste and aroma) properties which are equivalent to or even better than those of home canned products.

To reduce the amount of labor required in the process and to properly control the sterilization process, many canneries have installed continuous sterilizers, such as those made by FMC. These tall, continuous, high capacity sterilizing cookers have been built in recent years since the thinking was that faster, bigger and continuous were better. Another example is the "Hydromatic" sterilizer, which is an automatic continuous sterilizer available from Stork. It typically includes a first heat-up tower, followed by a pair of sterilizing towers, a cooling leg tower, a pair of spray-cooling towers, and a drying section tower to prevent recontamination. The cans are fed into the towers by an automatic feed and are carried through the system by a can holder chain arrangement and then fed out of the system by an automatic discharge. This sterilizer can handle vegetables, meats, baby foods, corn, fruits, soups, milk, cream, milk drinks, and evaporated milks in almost any shape of today's cans.

Heavy insulation and all-weather aluminum coverings allow the Hydromatic to be placed outdoors. A centralized drive can be positioned on the top of the cooker, such as above the final drying leg tower, and the shafts and wheels thereof allow the chain to reverse its direction of travel. The chains are constructed to be sturdy and to resist the risk of breakage through corrosion from the system's steam and water. The carriers are open, acting as bucket elevators, and thus the cans can be fed in along any point of the full length or height of the preheating tower and discharged at any point between the top and the bottom of the last cooling tower. Thus, one or even several feeder lines can be connected to the cooker at any height. Special carriers can be used to handle cans of unusual shapes or sizes.

The sterilizer uses the hydrostatic principle wherein steam pressure in the sterilizing section is balanced by water columns on either side thereof. The height of the columns depends on the required steam pressure, that is, on the temperature. The hydrostatic head can be adjusted through overflow valves so that the sterilizing temperature can be varied within set limits. The general concept of the cooker or sterilizer can thus be demonstrated by taking two bell jars, inverting one inside of the other and filling them with water. The inner one is then pressurized, and the water is pushed down and into the legs on either side of the space between the two bell jars. The columns of water on the outside add reverse pressure in the opposite direction and balance out at the pressure in the inside of the inner jar or steam dome.

The can carriers of the Hydromatic are fixed between a pair of endless conveyor chains which traverse the entire unit and take the cans through the preheating tower, the steam tower and the several cooling towers. The average temperature in the preheating column is close to the boiling point, and the cans which are filled at, for example, 160° F. are gradually heated as they pass through it. The sterilizing tower contains saturated steam and a number of up and down passages through this steam. The number of passages depends on the sterilizing time required. Since the chain speed and the water columns are variable, a wide variety of time-temperature combinations are possible. When the steam pressure drops, the water level rises and a float automatically opens a steam supply valve to admit steam and restore the pressure. After sterilizing, the cans are rapidly cooled in the cooling section by a counter current flow of cooling water. The cooling water, after being heated by the cans, is transferred to the preheating section where it is used to warm the incoming cans. The pressure and temperature drop in the first cooling leg, however, are gradual to reduce leakage in the seams of the can.

The cans can also be rotated throughout the preheating, sterilizing and cooling towers at a rate of, for example, from zero to twelve rotations per minute. The open carriers automatically pick up the cans which are waiting in rows for pickup. This open can carrier design allows for easy unloading since the cans are simply guided into a curve which causes them to slide out. The cans after discharge can be conveyed laying on their sides to a labelling machine.

Thus, cans from the filler lines are passed into the hydrostatic cooker/sterilizer for processing. The steam is introduced into the hydrostatic sterilizer at a fixed temperature, and the dwell time of the product in the sterilizer is adjusted by adjusting the conveyor chains that carry the product through the sterilizer. Different products, however, require different processing conditions in the sterilizer. Thus, for a different product it was necessary to empty the sterilizer and adjust the condition for the next product, which procedure takes an hour or two. Hence, it was not generally practical to change products during the course of an operating day since this would result in excessive downtime. Instead, the practice has been to produce one product for the entire operating day, thereby limiting the number of different products manufactured per shift, and to inventory the excess. These large inventories cost major food processing companies millions of dollars per year.

SUMMARY OF THE INVENTION

A novel system and process for sterilizing packaged products, such as canned soups, are herein disclosed. In the past (as stated above) after the cans had been filled and sealed they typically were conveyed through a tall (six or so story) hydrostatic sterilizer for approximately an hour to sterilize the products therein and thereby improve their keeping qualities. Different canned products have different sterilizing requirements (temperatures and/or dwell times), however. Thus, when a different canned product is to be run through this prior art sterilizer the sterilizer had to be first emptied and adjusted, resulting in expensive downtime and delays. The present system and process reduces significantly, if not eliminates, this downtown by running the sterilizer at a constant line speed providing, for example a fifty minute dwell time, and temperature, for example at 250° F., for all canned products. To handle the different sterilizing requirements for the different products, at least one of the different products is preheated significantly before entering the sterilizer, for example so that its internal temperature is raised seventy degrees. This preheating is accomplished by conveying the product through a preheating vessel generally separate from the sterilizer. If both different products are preheated, they are preheated to different temperatures, either in separate vessels or in the same vessel after adjustment thereof. The temperature and/or dwell time of the preheating vessel can be adjusted for a different canned product in ten, fifteen or twenty minutes compared with the hour or two required for the much larger sterilizer. In other words, by providing a separate (preheating) hydro-leg, the temperature can be varied (from 220 degrees to 265 degrees Fahrenheit, for example) within a short fifteen to twenty-minute period, thereby allowing a standard line speed to be maintained through the entire cooker for different products.

In contrast to the "preheater" leg of the known hydrostatic sterilizer which is simply a water leg, a preferred preheating vessel of the present invention comprises a steam dome having its own infeed and exit steam legs. Since the products, which are to be preheated, can now be filled in the cans at colder temperatures, even ambient temperature, product degradation is also no longer a problem.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 13 sets forth in tabular form the carrier arrangement for the apparatus of FIG. 12.

DETAILED DESCRIPTION OF PREFERRED EMBODIMENTS OF THE INVENTION

Figure 1:
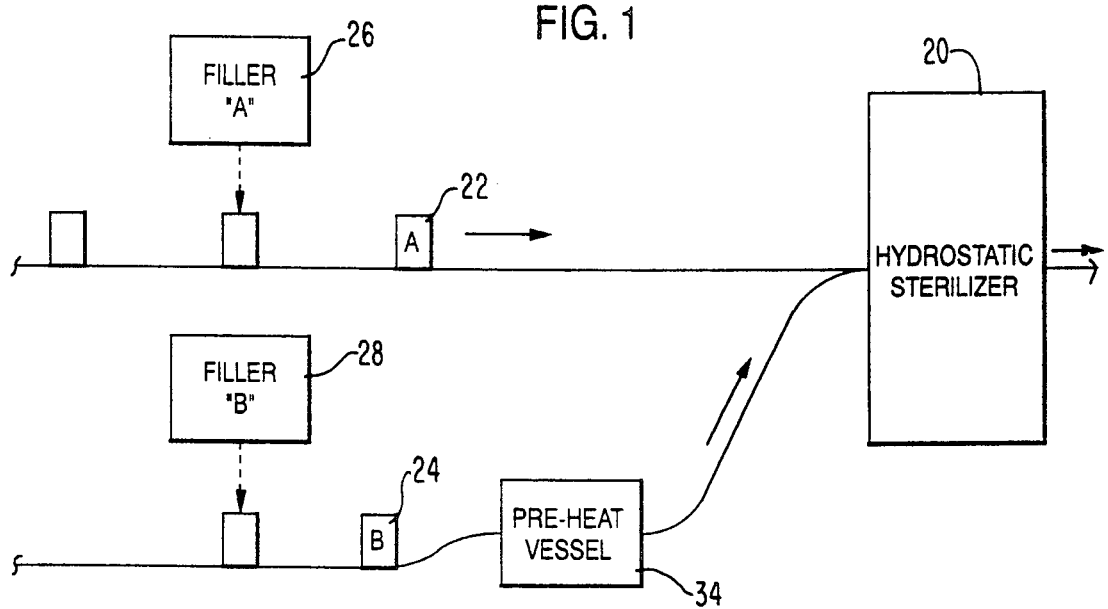
FIGS. 1, 2, 3, 4, 5, 6, 7 and 8 are diagrammatic views of first, second, third, fourth, fifth, sixth, seventh and eighth systems of the present invention.

Referring to FIGS. 1-8, a number of variations of the present invention are illustrated. The underlying concept of all of them though is that to accommodate the different heating requirements of different canned products, so that they can both pass through the same hydrostatic sterilizer shown generally at 20 under the same conditions and at the same rate, that one of the canned products is preheated a significant amount before being passed through the sterilizer. If both are preheated, they are preheated differently. The different canned products are shown in FIGS. 1-8 by reference numerals 22 and 24 (and letters A and B) after filling by fillers 26 and 28, respectively, and after sterilization in the hydrostatic sterilizer 20 are designated by the same letters and reference numerals followed by a prime (') designation. The cans (or other sealed packages) of the products and the equipment of the fillers 26 and 28 are conventional and known in the art, and thus no additional disclosure is herein provided for them. Various ways of preheating the products 22, 24, conveying them through the hydrostatic sterilizer 20, and separating them after sterilization are new though and are illustrated in the drawings and are described herebelow.

Figure 2:
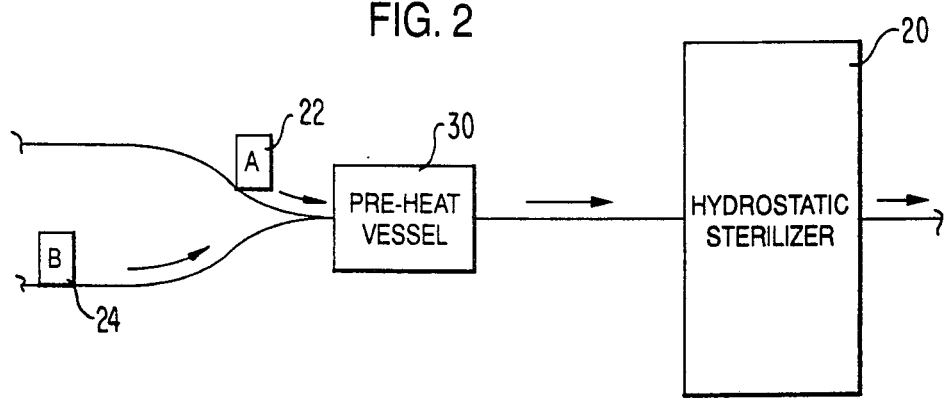
Figure 3:
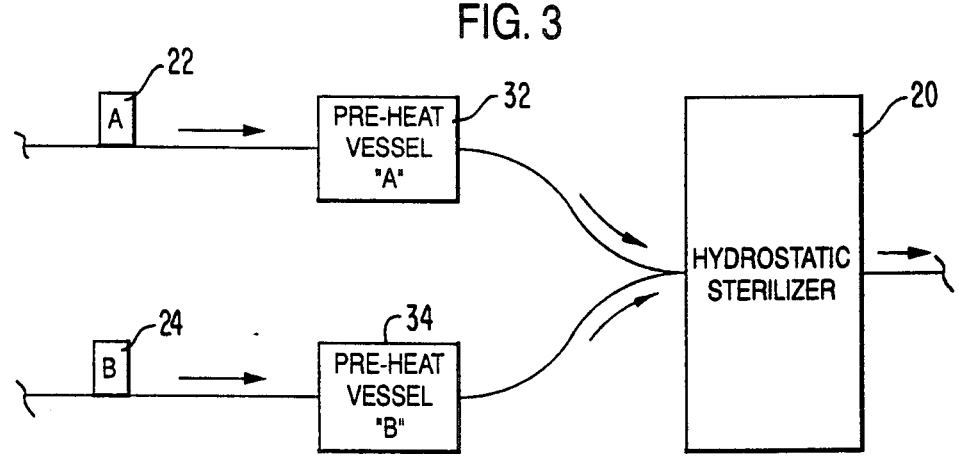
Figure 4:
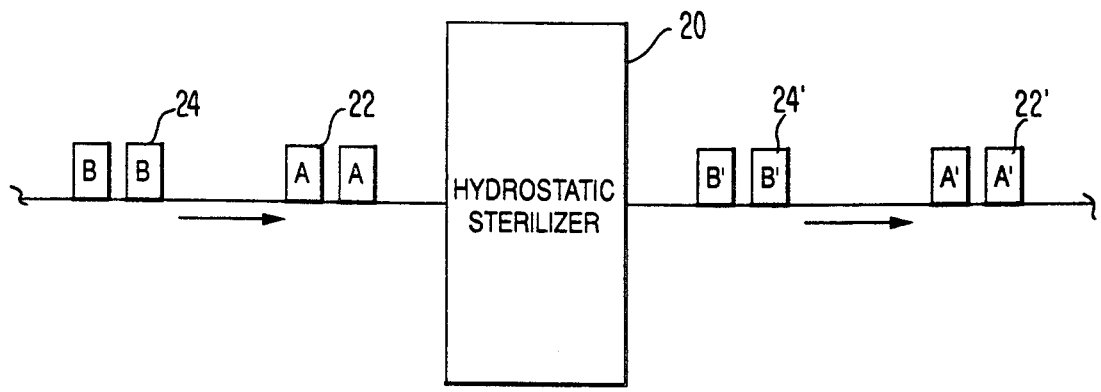
Figure 5:
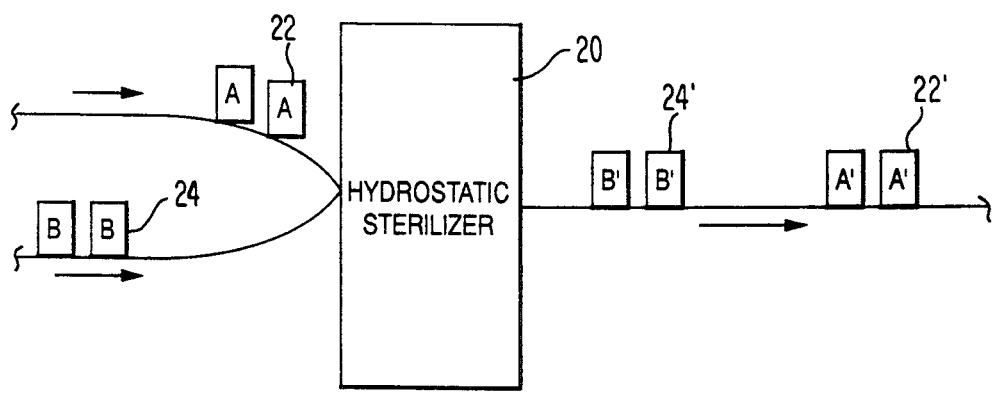
Figure 6:
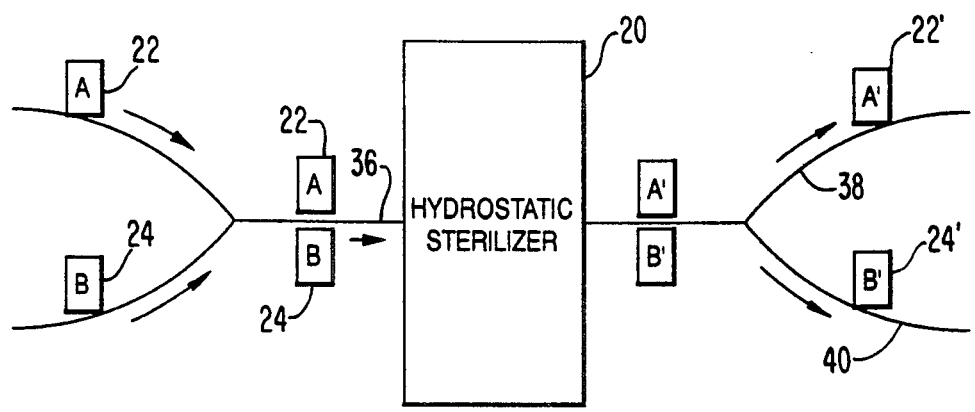
Figure 7:
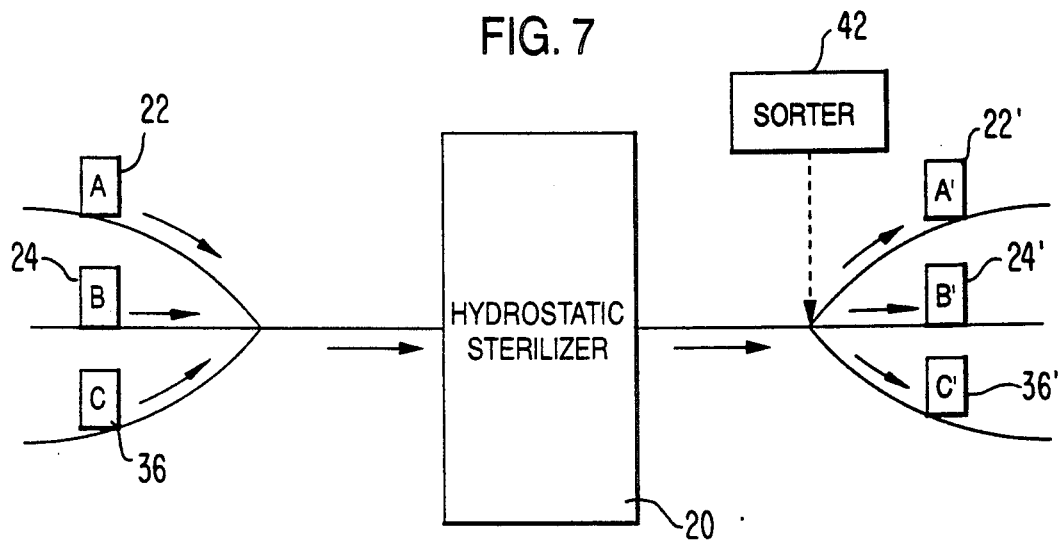
Figure 8:
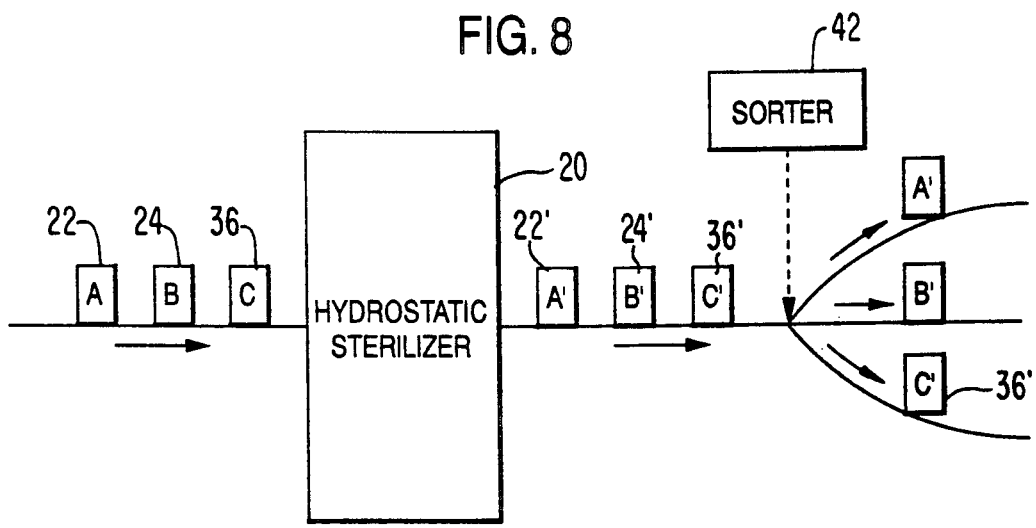

Referring to FIG. 2, the product typically moves through the preheater or preheat vessel 30 at a constant rate. As an example, product 22 is introduced into the preheater 30 and heated to a temperature of 255°, and after four hours, a decision is made to switch over to product 24. The feed of product 22 is then stopped, but the sterilizer 20 continues to operate. The temperature in the preheater 30 is adjusted to the appropriate temperature for product 24, such as a lower 245° F. When it reaches a stable condition, product 24 is fed into the preheater 30 and then into the sterilizer 20, as shown in FIG. 2. Thus, after a period of time, an examination of the sterilizer 20 would show a block of product 22 passing through the sterilizer, a gap of approximately ten minutes and then a block of product 24, as shown in FIG. 4. The desired amounts of products 22 and 24 can thus be produced without a lengthy shutdown of the sterilizer 20 and without a large product inventory resulting. If only one product (product 24) needs to be preheated, the system of FIG. 1 can be used.

Where two preheaters 32, 34 are used in a single system, as depicted in FIG. 3, two products can be fed at the same time, as alternating cans of product 22 and product 24, for example, or for three products, as products 22, 24 and 36 (product C), as shown in FIG. 8. In another case, two different products 22, 24 can be continuously and simultaneously fed into the sterilizer, one on each side of the conveyor chain 36, as depicted schematically in FIG. 6. Two separate discharge paths 38, 40 can then be used, one for the cans on each side of the chain 36. In fact, three of four products can be run through the sterilizer at one time, as depicted in FIG. 8 by reference numerals 22, 24 and 36, by operation of suitable (rotary) preheaters. The discharge, however, would have to make the appropriate selection to separate the cans. One method is to use photoelectric, readable bar codes and a suitable reader shown schematically and generically at 42 at the discharge end of the sterilizer 20 to separate the products 22, 24, 36 on the basis of bar codes thereon. With this arrangement, the order of feed into the sterilizer 20 is not critical. Thus, various combinations of both the number of preheaters and the type of preheaters (agitating or non-agitating) can be used in combination with a single hydrostatic sterilizer 20. This greatly improves the efficiency of the sterilizer 20 and reduces the amount of product inventories resulting.

Some products, such as bean and pasta products, must be agitated to prevent unattractive clumping of their ingredients. On the other hand, some other products are damaged by excessive agitation; for example, cream soups tend to separate and delicate ingredients tend to break apart. This invention easily handles these different agitation requirements by providing a number of different preheaters. For example, one product can be fed through an agitating pre-heater set at one temperature, a second run through a non-agitating preheater set at another temperature, and a third whose processing parameters do not require preheating can be fed directly into the hydrostatic cooker or sterilizer. The choice of agitating or non-agitating preheaters is related to the products being processed. In contradistinction, traditional agitation dependent processes are extremely sensitive, and a portion of the product is incubated ten days or more and examined for spoilage before it may be released for sale. The present invention does not rely on product agitation for satisfactory processing, and thus an incubation step is not needed.

Figure 9:
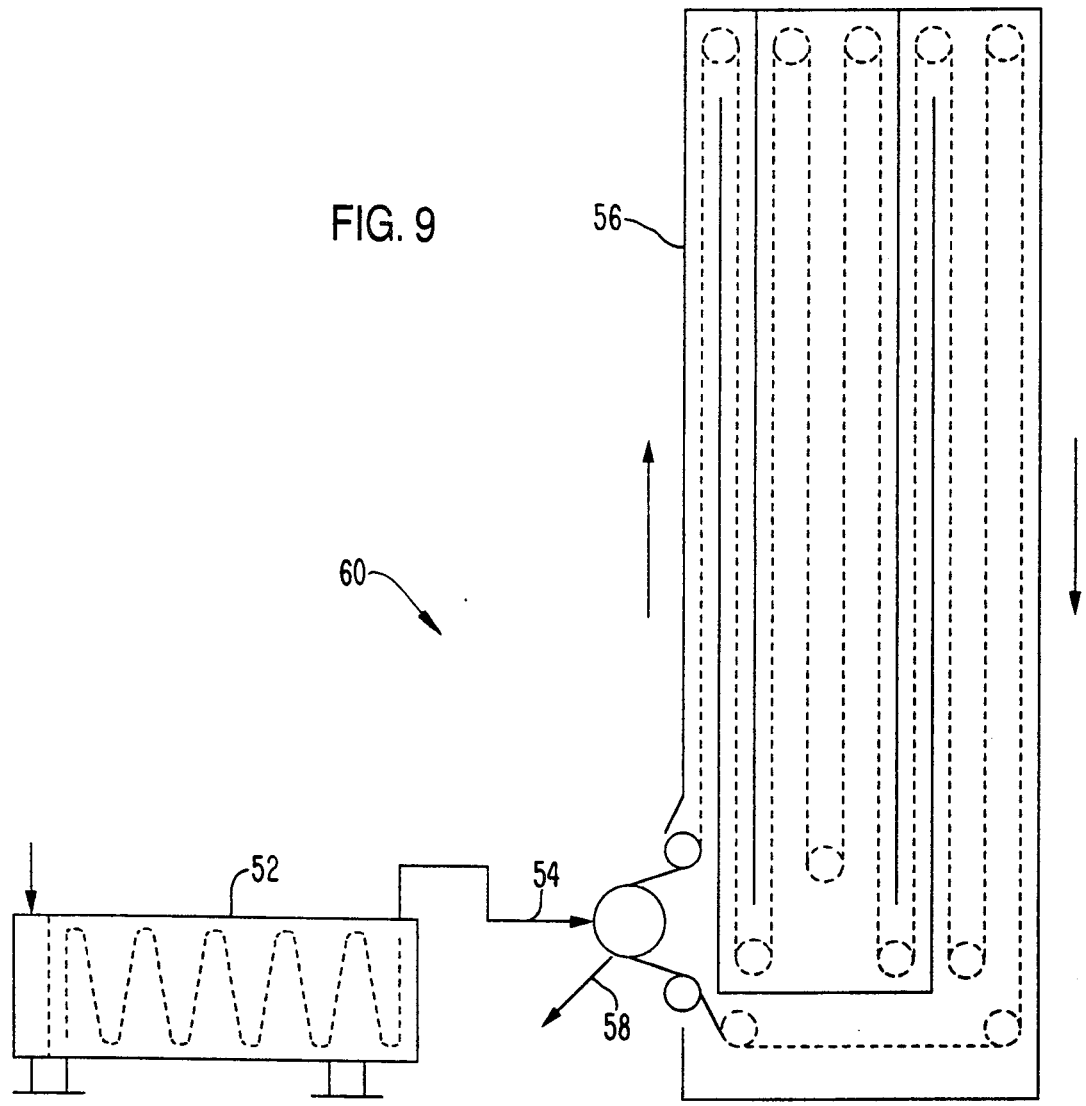
FIGS. 9, 10, 11 and 12 are side schematic views of first, second, third and fourth apparatuses of the present invention.
Figure 10:
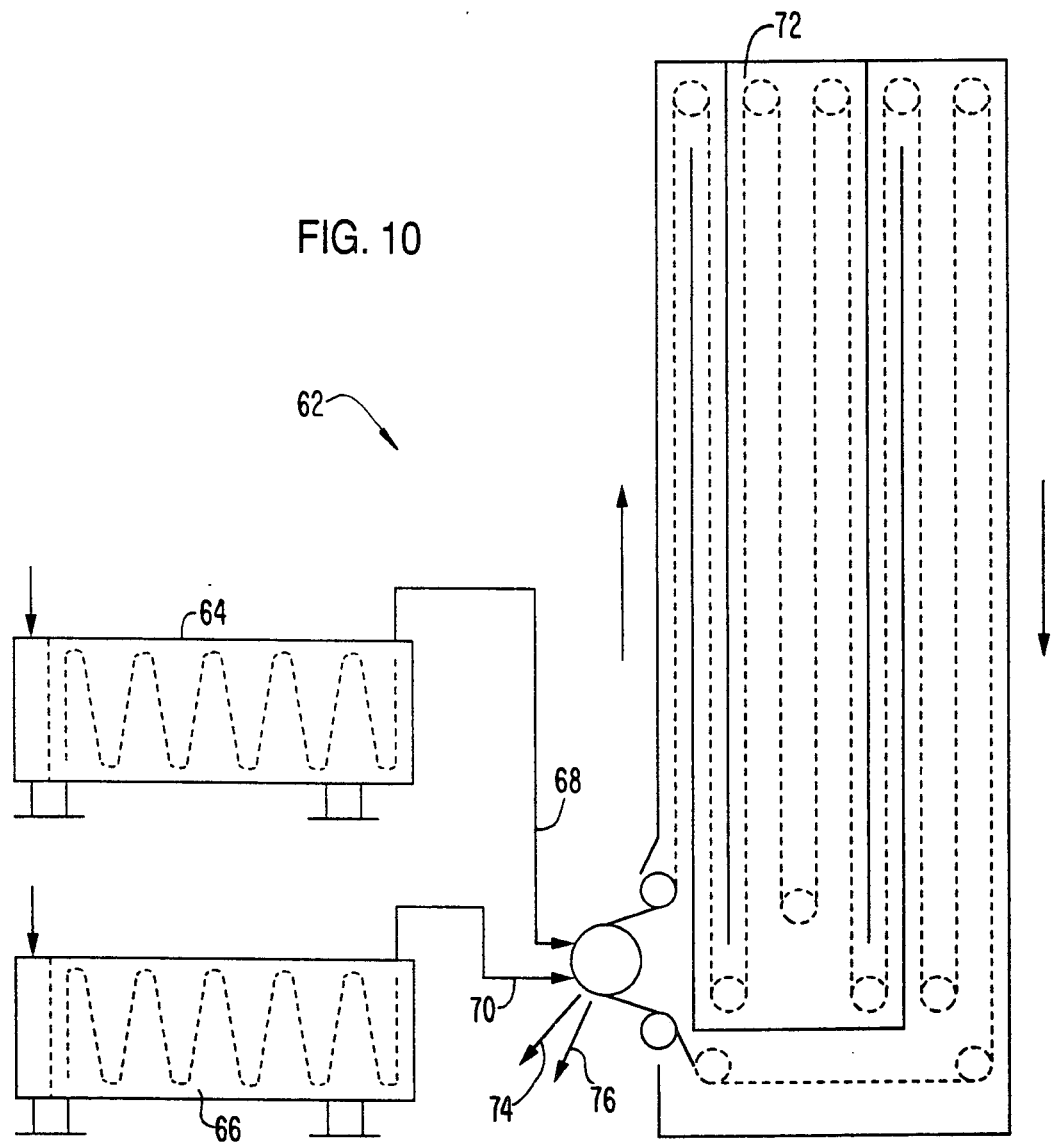
Figure 11:
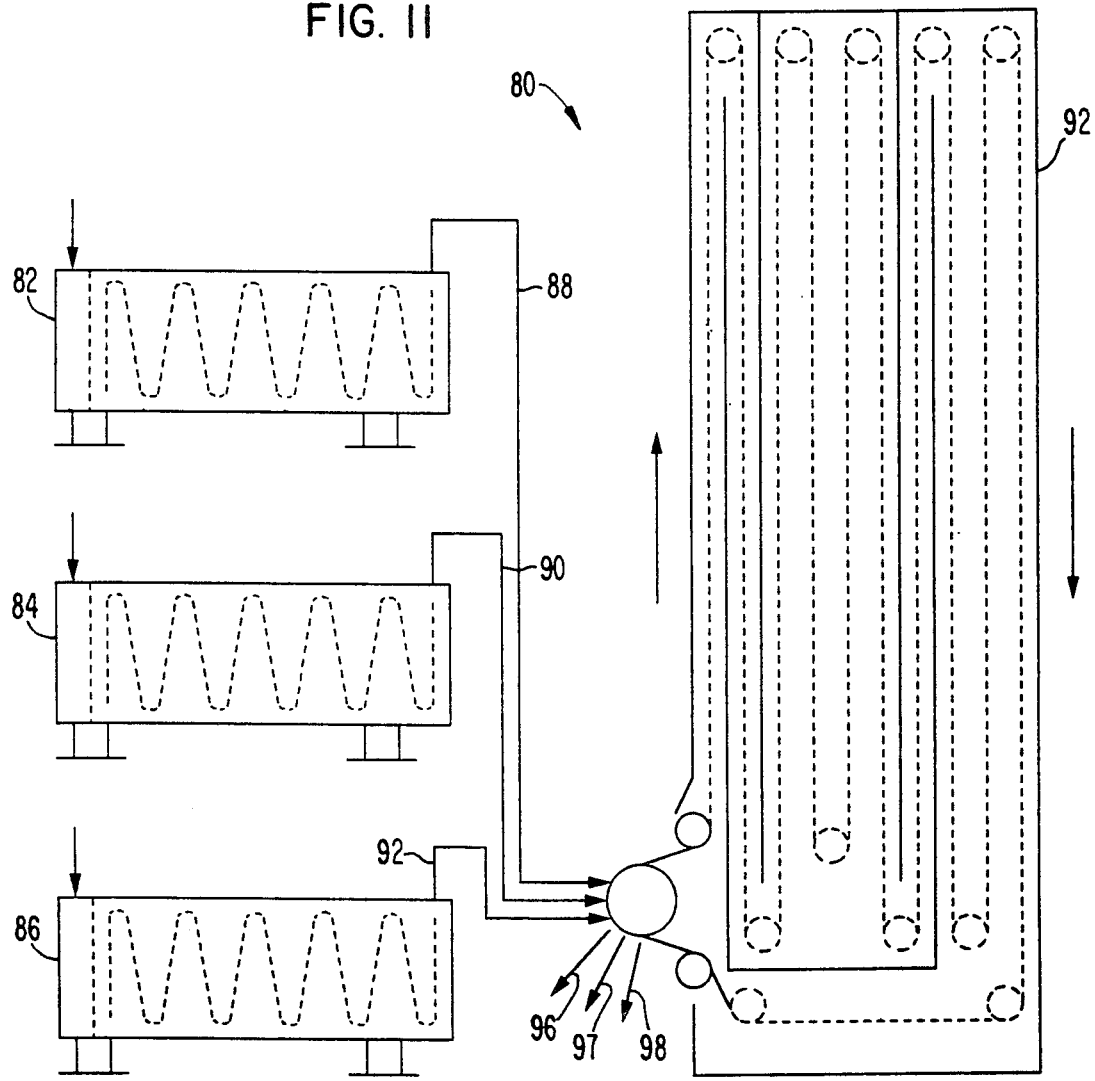

Since many large food processing companies produce a number of products having different heat requirements, the preheating flexibility of this invention is useful for an efficient manufacturing process. For example, in FIG. 9 a first rotary pre-heat hydrostatic system, including a non-agitating rotary preheat 52 vessel feeding the cans through an infeed 54 into a hydrostatic sterilizer 56 and then out a discharge 58, is illustrated generally at 60. FIG. 10 shows another system at 62 including an agitating rotary pre-heat vessel 64, a non-agitating rotary pre-heat vessel 66, a pair of infeeds 68, 70 from the pre-heat vessels into the hydrostatic sterilizer 72, and a pair of discharges 74, 76 exiting therefrom. The system 80 of FIG. 11 has two non-agitating rotary pre-heat vessels 82, 84, an agitating rotary pre-heat vessel 86, three infeeds 88, 90, 92, a hydrostatic sterilizer 94 and three discharges 96, 97, 98.

With prior art systems, cans are processed in cookers for fifty, sixty or eighty minutes or whatever is needed at 220° to 250° F., with 240 or 250 degrees being common. This invention standardizes the line speed at, for example, forty-five or fifty minutes at 250° F. by preheating the cans up to a temperature of, for example, 200°. The sealed containers first pass through a preheat vessel in which any heating not capable of being supplied by those fixed conditions is provided. Considerable savings are possible since it only takes about ten minutes to adjust the operating conditions of the preheater to accommodate different products.

Figure 12:
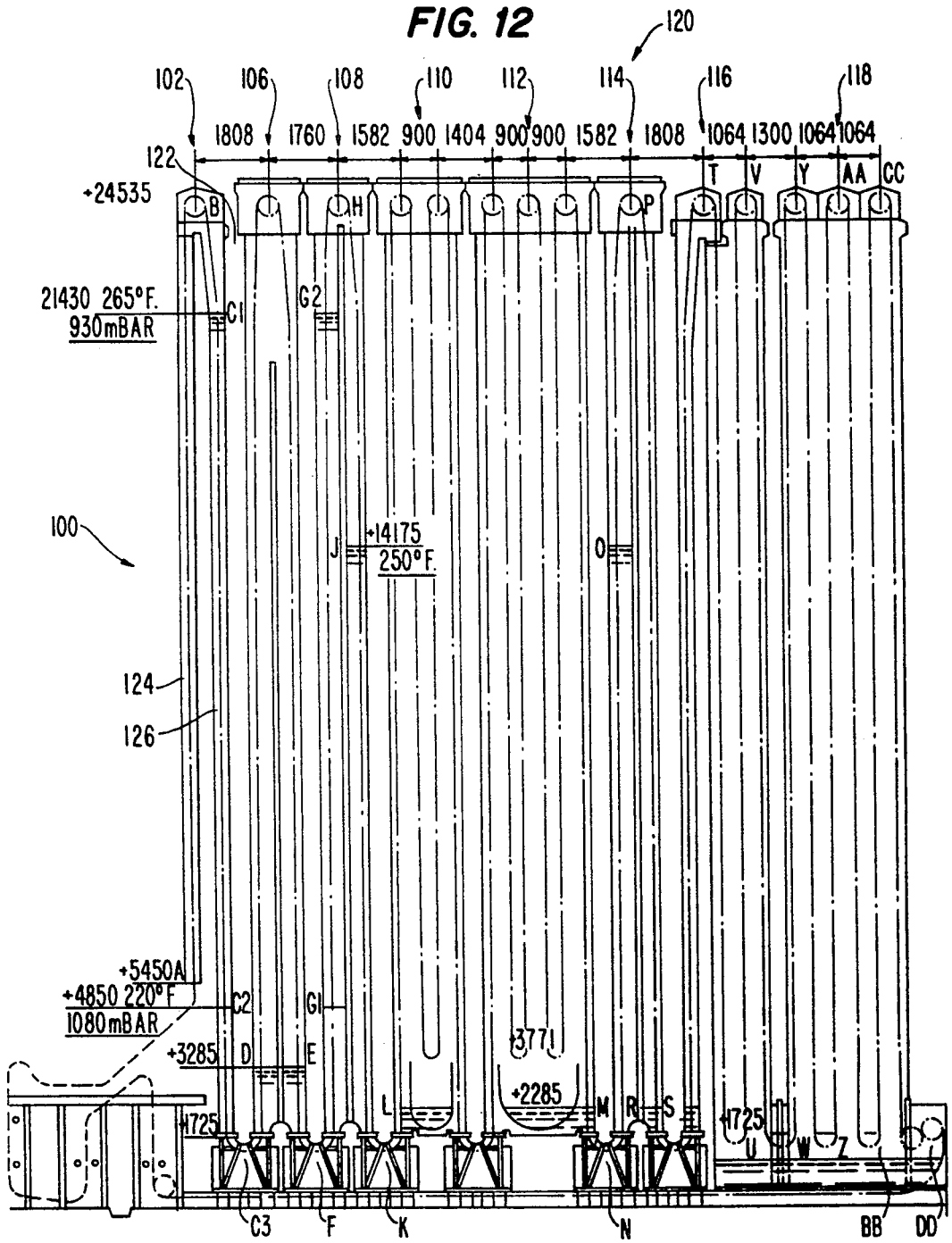

A preferred system of this invention is shown in FIG. 12 generally at 100. The first tower of system 100 shown generally at 102 is the infeed section to the preheat tower. This preheat leg 102 is not significantly different from the other legs, except it may be a little taller in order to handle the higher pressure needed at the higher temperatures. The cans are transferred through the hydrostatic leg into the preheat section—the second tower shown generally at 106. The third tower shown generally at 108 is the transfer section. The cans pass through the two hydrostatic legs, one of which maintains the steam pressure in the preheat tower and the other of which maintains the steam pressure in the processing tower. The fourth and fifth towers 110 and 112 are the actual processing sections of the system, and the sixth tower 114 is another transfer section. The cans pass through another hydrostatic leg and into the last two towers 116 and 118—the cooling sections.

In other words, a first hydrostatic circuit is circulated in the preheat vessel and a second hydrostatic circuit is circulated in the hydrostatic sterilizer, and the second circuit is different and generally separate from the first.

Saturated steam is used for product sterilization, and steam (or a steam-air mixture) is used for preheating in the system 100. Although the sterilizing media is saturated steam such as is currently used for the sterilization of metal cans, using super-heated water is also within the scope of the invention. The average temperature in the preheat vessel during the preheating step can be maintained, for example, at the boiling point of the water therein. During the preheating steps the cans or other packages can be preheated to a temperature higher than that of the sterilizing temperature of the hydrostatic sterilizer. In other words, in the preheater the packages can be pulsed, for approximately ten minutes for example, with steam heat which is hotter than the sterilizing heat to which they are subjected as they are passed through the hydrostatic sterilizer.

As an example, for a can size of 211×400, the capacity of system 100 is eight hundred cans per minute, the sterilizing time is fifty minutes, the sterilizing temperature is 250° F., the preheating time is ten minutes, the preheating temperatures are between 220° F. and 270° F., and the cooling time is sixty minutes. For typical canned products and a ten minute residence time, the flexibility is from 220° to 265°, and this accommodates both ten-ounce and nineteen-ounce cans.

If the preheater 102 were placed totally within the hydrostatic cooker shown generally at 120 and which includes towers 106, 108, 110, 112, 114, 116 and 118, quick changes of preheater temperature would not be possible. An air space separation or thermal buffer is thus provided as shown at 122 between the preheat leg or tower 102 and the cooker 120 to allow the temperature in the preheat leg to be changed from 220° to 265°, for example, in less than forty-five minutes. By separating the legs the temperature of the cooker 120 can be raised to 265° F. Currently, standard hydrostatic cookers for cans do not typically process at 265°. Although they could be built to do so, they would be exceptionally tall.

Differences in product heating rates and initial product temperatures are compensated for by regulating the process temperature in the preheating section 102. Steam or a steam/air mixture is the medium in the preheat tower 102. A temperature of 270° F. represents a vapor pressure of forty-two psi. The total pressure is a standard pressure corresponding with twenty-four meters of water, or forty-nine psi, which results in an over pressure for the air of a minimum of seven psi. Due to the high pressure of the twenty-four meters of water built into one leg, the system 100 of FIG. 12 is about twenty feet higher than conventional 250° F. processors. The main chain is sturdier than prior art chains due to this additional height and has a 70×70 design. The length of the carriers is two centimeters or 8/10 of an inch shorter than standard to accommodate the wider chain and to be able to apply standard drives, shafts and other components. The carrier lay-out is set forth in FIG. 13. The system 100 preferably has a carrier monitoring system and an automated start-up system since changeovers have to be made quickly and bringing two pressure chambers up manually is difficult.

A first embodiment of this invention can have a single infeed system with a maximum capacity of eight hundred and fifty cans per minute and a cycle time of 2.4 seconds, and a nominal capacity of eight hundred cans per minute at fifty minutes and a 2.55 seconds per cycle time. A second embodiment can have a larger pitch of the main chain and a double infeed and discharge due to the increased nominal cycle time and can also handle a 303×500 can size. A one hundred and fifty-two millimeter chain pitch in the first machine instead of one hundred and twenty millimeters can be used without lowering the height of the sterilizing section and the cooling section. The nominal speed for 211×400 cans becomes six hundred and thirty-one cans per minute instead of eight hundred cans per minute, however. The height of the sterilizing and cooling sections can be lowered step by step with each step representing a capacity drop of about fifty cans per minute.

In the past, the products were typically filled at an elevated temperature to shorten their residence time in the cooker. Since the products can now be filled at ambient temperature, the problem of maintaining the products at the elevated initial temperature is eliminated. Thus, the preheat leg 102 allows the products to be filled at colder temperatures thereby eliminating the problems of product degradation in the blending facilities and then in the can itself. Starches, condiments and garnishes need not be held at, for example, 190° for an additional time.

When there was a line stoppage in the past after a product has been filled at 150°, for example, the temperature loss was significant due to its temperature difference with the environment. In contrast, if the product is only 80° then the loss of temperature is much slower because it is almost at equilibrium. Longer downtimes can thus be tolerated with the present process since the products are colder. The products, thus, need not be heated before being filled in the container. The additional heat can be pulsed for about ten minutes into the can in the preheater 102 and then sent to the final portion of the cooker 120 for the final sterilization. This pulse of heat is at a higher temperature than that of the cooker processor 120. In other words, the initial temperature is set for entry into the final sterilization mode.

The cold blending technique of this invention has further advantages. Industrial scale blending or cooking of the food, or more particularly soup, is in large batches. In other words, it (the soup) is blended in a large kettle because to blend it in a number of small kettles would be inefficient. Some period of time on the order of a half an hour is required though to fill the individual cans and thereby completely empty the kettle. When the soup has been sitting for a while in the kettle, its heavier components, its vegetables and meat and so forth, sink to the bottom. Thus, the individual cans have different concentrations of meat and liquid depending on when they are filled. One known solution is to add starch to the mixture to make it thicker and to prevent the heavier components from settling. The starch selected depends not only on its capabilities for suspending the garnishes and other components of the soup, but also for the mouthfeel, texture, appearance and taste it adds.

For "hot" blending when the mixture is heated in the kettle, problems have been experienced with the last batches of the soup to be emptied from the kettle. They tend to overcook sitting in the kettle hot for that time, and their vegetables thus become soft. Also, the extra heat breaks the starches down, so near the end of the kettle there is uneven distribution of meat and vegetables. Thus, additional starch must be initially added.

Neither one of these problems is present with cold blending, however. Although the mixed soup may sit in the kettle for half an hour or so, there is no overcooking since it is sitting cold. Since there is no heat to break down the starch, less starch can be used. In fact, five to twenty-five percent or approximately ten percent less can be used, thereby reducing the cost of the ingredients per can. Since less starch is used, the soup will have a less cloudy or turbid appearance to it. The taste may also be altered since some starches, like wheat flour and potato starch, have a certain taste to them.

With the present cold blending technique the soup can remain in the kettle longer during the filling operations, since overheating is not a problem, and thus larger batches can be more economically made. While filling previously had to be completed in twenty or thirty minutes, a two hour period appears to be available with the present process. Thus, 20,000 as opposed to 5,000 pound batches are possible.

Thus, the technique of the present invention wherein the food product is cold blended at a temperature of between 70°–130° and preferably between 70° and 80° or room temperature, filled cold (for example soup at below 100°) in the cans, passed through the preheater where significant preheating is done, and then passed preheated to and through the hydrostatic cooker at approximately 250° and for a fifty-five minute process time has a number of advantages. It is not commercially practical though to cold blend the soup and pass it cold directly into the hydrostatic cooker. This is because an additional ten to fifteen minutes would be needed in the existing cookers and the throughput or cans per minute would be reduced by ten to twenty percent.

Bean and bacon soup, though blended at the same temperature as cream of mushroom, heats differently. If it heats slower, that means that without the preheat leg 102 the process time would have to be increased. The present invention allows the temperature to be raised so that the initial temperature of the product is sufficient to provide a fifty-minute final sterilization time for a commercially sterile product.

How much preheating of the product is needed? As an example, if the cans are to be filled at 80° then the process speed design is based upon an internal temperature of 150°. The product would be pulsed through the preheater for a fixed time of, for example, ten minutes. For example, for bean and bacon, the temperature would be changed to 265° which would raise the temperature at the center of the can entering into the preheater from 80° to an effective temperature of 150°, or a (plus) 70° change.

Thinner products, on the other hand, that heat more rapidly would be filled at 80°, and the preheater might be run at only 220°. The infeed legs on a standard hydrostatic cooker cannot be run or maintained at that higher temperature even 220°. The best one can get is around 205° or they would be boiling. Boiling does not result in the preheat leg 102, however, because it is a steam leg; it in essence is a mini-hydro with a single ten-minute pass of steam. It has two separate legs an infeed leg 124 and an exit leg 126 and then it goes into atmospheric pressure. It is still embodied inside of the system 100 but not exposed to the environment. It is out of the water and out of the steam and just at air pressure. The cans then are conveyed into the infeed leg 106 of the main portion of the cooker 120 and then into the 250° dome 110, 112.

The present system does not handle conventional glass container products well because glass cannot handle the rapid changes in temperature involved herein. Some plastics can be kept from deforming by changing the amount of overpressure added into the preheat. For example, polypropylene at above 170° F. starts to become fluid. Thus, since the modulus of the structure does not hold up well, the internal pressures need to be balanced.

The invention can be incorporated in either a single unit along with the sterilizer, which is more likely when a new system is to be built as shown by 100 in FIG. 12, or as a separate unit integrated with a sterilizer unit which can give more flexibility. A determining factor is which produces more products on a continuous basis. Two existing pieces of equipment—a (an agitating) rotary cooker and a hydrostatic sterilizer—can be integrated to solve the problem in the canned thermally processed food industry.

Agitating rotary cookers, many of which are made by Anderson and Barhouser, FMC, and Stork, are used to produce thin products that lend themselves to agitating once when you rotate them through the cooker. They are horizontal cookers through which the cans spiral. As the cans spiral, they come down on the bottom arc of the circle, drop out of a sleeve and roll onto the bottom of the cooker so that the can spins itself. The sleeve is slotted which allows each can to have its own individual slot to move through as it travels through the cooker. The outer shell of the cooker has riflings which allow the can to spiral through the cooker and come out the other end and thereby defines a continuous cooker. From the top or the twelve o'clock position the cans swing clockwise, and when they reach the four o'clock position, they fall out of the sleeve and onto the wall or shell of the cooker. The sleeve though still contacts the cans and pushes them across the wall or shell or the bottom of the arc of the circle from the four o'clock all the way to the eight o'clock position. While it is pushing them, the cans are spinning, and once they come up on the other side, they are picked up by the sleeve again and stop spinning. Thus, they are not spinning through three-quarters of the arc of the circle, they are just spiraling through the cooker. On the bottom, however, they are not only spiraling but also rotating.

The AB cooker, for example, is a very short cooker and economically priced when compared with the stationary hydrostatic cooker, which is six or seven stories high. The spiraled shell of the preheater allows more cans to be processed in a smaller space. For example, five hundred and fifty-two ten-ounce cans can be accommodated in a thirty foot preheater on a continuous basis. In contrast, a straight track for that many cans would be eight hundred feet long. The temperature range is from 200° approximately to 270°, which provides good flexibility to pulse a lot of heat into the products as needed and less heat as needed to satisfy a common line speed.

The rotary cooker has a cooking shell and a cooling shell—two horizontal shells that are hooked together in tandem through a transfer valve. The cooking shell can be disconnected and removed for the two-piece embodiment of this invention. As the cans exit the heater, they are run up through a can track and into the infeed of the hydrostatic sterilizer. In other words, a can line is run from where the cans exit the preheater to the infeed of the primary hydrostatic sterilizer.

In a rotary preheater, the temperature can be quickly changed in five minutes. If the preheater were incorporated in the cooker, changing the temperature in the preheater would require more time, around twenty-five or thirty minutes, since it depends on hydrostatic water columns or hydrostatic pressure generated by the water columns. Thus, additional changeover time is required. However, from a maintenance and a functionality standpoint, it is easier to operate.

The pressure conditions of the rotary preheater and the hydrostatic sterilizer are whatever the saturated steam pressure is; the pressure is not controlled. In other words, steam has a certain pressure at whatever temperature it is being run at, at 250° it is 15.1 pounds gauge pressure and at 260° it is generally twenty pounds. The temperature in the preheat leg is thus adjusted to provide a certain pressure. For glass and some plastics, the external pressure cannot be too much greater than the internal pressure of the container, and the hotter the product in the container, the greater the internal pressure. Thus, the external and internal pressures of the container must be matched, so that the container is not damaged or fail.

The thermal process is based on a certain temperature that the can achieves after a given time. The temperature at which the can goes into the cooker determines how long it has to spend in the cooker to achieve its final temperature. Thus, by raising the temperature of the can as it goes in, the amount of time that the can must stay in the sterilizer is shortened and the line speed can thereby be increased.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A packaged product sterilizing process, said process comprising the steps of:
    preheating a plurality of first packages, each containing at least one thermally-treatable product, in a preheat vessel;
    passing the preheated first packages through a hydrostatic sterilizer and thereby sterilizing the products in the first packages; and
    passing a plurality of second packages, which are generally separate from the first packages and each of which contain at least one thermally-treatable product, having different initial sterilization processing requirements than those products of the first packages, through the hydrostatic sterilizer at the same processing time and temperature as that of said passing the preheated first packages step, and thereby sterilizing the products in the second packages.

2. The process of claim 1 further comprising, before said passing the second packages step, preheating the second packages in the preheat vessel to a different temperature than that to which the first packages are preheated.

3. The process of claim 2 further comprising, before said preheating the second packages step and after said preheating the first packages step, altering the temperature in the preheat vessel, and said preheating the second packages step being at the altered temperature.

4. The process of claim 3 wherein said preheating the first and second packages steps are with substantially the same conveying dwell time of the first and second packages in the preheat vessel.

5. The process of claim 3 further comprising operating the hydrostatic sterilizer continuously between said preheating the first and second packages steps.

6. The process of claim 3 wherein said altering step includes reducing the temperature in the preheat vessel from two hundred and fifty-five degrees Fahrenheit for the first packages to two hundred and forty-five degrees Fahrenheit for the second packages.

7. The process of claim 3 wherein said altering step is completed in less than fifteen minutes.

8. The process of claim 7 wherein said altering step is completed in no more than ten minutes.

9. The process of claim 1 further comprising the preheat vessel defining a first preheat vessel, providing a second preheat vessel utilizing different preheating conditions than those of the first preheat vessel, and before said passing the second packages step, preheating the second packages in the second preheat vessel.

10. The process of claim 9 wherein said preheating the first packages step includes agitating the first packages in the first preheat vessel.

11. The process of claim 10 wherein said preheating the second packages step includes passing the second packages through the second preheat vessel without agitating the second packages.

12. The process of claim 9 wherein said passing the preheated first and second packages steps are conducted substantially simultaneously in the hydrostatic sterilizer in a joint passing step.

13. The process of claim 12 wherein said joint passing step includes the preheated first and second packages traveling through the hydrostatic sterilizer on opposite sides of a conveyor chain of the hydrostatic sterilizer.

14. The process of claim 12 wherein said joint passing step includes the preheated first and second packages being positioned in alternating relation on the same side of the conveyor chain of the hydrostatic sterilizer.

15. The process of claim 12 further comprising, after said joint passing step, separating the sterilized first and second packages from each other.

16. The process of claim 15 wherein said separating step includes determinig whether each of the sterilized packages is the first or second packages and thereafter directing the sterilized first packages along a first path and the sterilized second packages along a second path different than the first path.

17. The process of claim 16 wherein said determining step includes the first and second packages having different indicators on them and reading these different indicators.

18. The process of claim 17 wherein said determining step includes the different indicators comprising photoelectric readable bar codes.

19. The process of claim 16 wherein said directing step includes controllably switching a discharge conveyor track of the hydrostatic sterilizer between communication with the first and second paths.

20. The process of claim 1 wherein said passing steps include the same conveying dwell time for the first and second packages in the hydrostatic sterilizer and the same hydrostatic sterilizer dwell temperature and pressure.

21. The process of claim 1 wherein said passing steps include a sterilizing time in the hydrostatic sterilizer of fifty minutes and a sterilizing temperature in the hydrostatic sterilizer of 250 degrees Fahrenheit.

22. The process of claim 1 wherein said preheating step includes preheating the first packages in steam.

23. The process of claim 1 wherein said preheating step includes preheating the first packages in a steam-air mixture.

24. The process of claim 1 wherein said passing steps include the first and second packages being the same size and shape.

25. The process of claim 1 further comprising maintaining the average temperature in the preheat vessel during said preheating step at the boiling point of the water therein.

26. The process of claim 1 further comprising maintaining a standard line speed for the packages for both said passing steps.

27. The process of claim 1 further comprising varying the temperature in the preheat vessel between 220 and 265 degrees Fahrenheit.

28. The process of claim 1 wherein said preheating step preheats the first packages to a temperature higher than the sterilizing temperature of the hydrostatic sterilizer during said passing the preheated first packages step.

29. The process of claim 1 further comprising, before said preheating step, filling the first packages with their product at ambient temperature and sealing the filled first packages.

30. The process of claim 1 wherein the preheat vessel comprises a steam preheat vessel, said preheating the first packages step includes conveying the first packages through the steam preheat vessel and said conveying step includes the first packages entering the steam preheat vessel with their products therein being at ambient temperature.

31. The process of claim 1 further comprising the preheat vessel comprising a steam preheat vessel, and raising the temperature in the steam preheat vessel to 265 degrees Fahrenheit.

32. The process of claim 1 further comprising, before said passing the preheated first packages step, conveying the preheated first packages while at generally atmospheric pressure from the preheat vessel to the hydrostatic sterilizer.

33. The process of claim 1 wherein said preheating the first packages step includes pulsing the first packages with steam heat hotter than the sterilizing heat in the hydrostatic sterilizer during said passing steps.

34. The process of claim 33 wherein said pulsing step is for approximately ten minutes.

35. The process of claim 1 further comprising the first packages comprising metal containers, and before said preheating step, filling the metal containers with their product and thereafter sealing the filled metal containers.

36. The process of claim 1 further comprising the first packages comprising plastic containers, and before said preheating step, filling the plastic containers with their product and thereafter sealing the filled plastic containers.

37. The process of claim 1 wherein the hydrostatic sterilizer includes a sterilizing column using saturated steam as the sterilizing medium, and said passing steps include sterilizing the packaged products in the saturated steam.

38. The process of claim 1 wherein the hydrostatic sterilizer includes an overpressure sterilizing tower using superheated water as the sterilizing medium, and said passing steps include sterilizing the packaged products in the superheated water.

39. The process of claim 1 further comprising the product of the first packages comprising a soup, and before said preheating step, filling the soup in the first packages with the soup being at a temperature below 100 degrees Fahrenheit.

40. The process of claim 1 further comprising, during said preheating step, circulating a first hydrostatic circuit in the preheat vessel, and during said passing steps circulating a second hydrostatic circuit, which is different and generally separate from the first hydrostatic circuit, in the hydrostatic sterilizer.

41. The process of claim 1 wherein said passing steps are conducted substantially simultaneously with each other.

42. The process of claim 1 further comprising the first and second packages being sealed during said passing steps, and after the respective said passing steps, distributing the first and second sealed packages to different spaced locations.

43. The process of claim 1 wherein said passing the first packages step occurs at least substantially after said passing the second packages step.

44. The process of claim 1 wherein said passing the second packages step occurs at least substantially after said passing the first packages step.

45. The process of claim 1 further comprising, before said preheating step, sealing the first packages, and before the passing a plurality of second packages step, sealing the second packages.

46. The process of claim 45 further comprising, after said passing the first packages step, transporting the first packages while still sealed to a first location and, after said passing the second packages step, transporting the second packages while still sealed to a second location different and spaced from the first location.

47. The process of claim 1 further comprising, before said preheating step, sealing the first packages with their products therein.

48. The process of claim 1 further comprising, before said passing the second packages step, sealing the second packages with their products therein.

49. A packaged product sterilizing process, said process comprising the steps of:
  preheating a plurality of first packages, each containing at least one thermally-treatable product, in a preheat vessel;
  passing the preheated first packages, after sealing thereof, through a hydrostatic sterilizer and thereby sterilizing the products in the first packages;
  passing a plurality of sealed second packages, each containing at least one thermally-treatable product having different initial sterilization processing requirements than those products of the first packages, through the hydrostatic sterilizer at substantially the same processing time and temperature as that of said passing the preheated first packages step, and thereby sterilizing the products in the second packages; and
  after the respective said passing steps and with both the first and second packages sealed, distributing the first and second sealed packages to different spaced locations.

50. A packaged product sterilizing process, said process comprising the steps of:
  preheating a plurality of sealed first packages, each containing at least one thermally-treatable product sealed therein, in a preheat vessel;
  passing the preheated first packages through a hydrostatic sterilizer and thereby sterilizing the products sealed in the first packages; and
  passing a plurality of sealed second packages, each containing at least one thermally-treatable product sealed therein, the product of the second packages having different initial sterilization processing requirements than the product of the first packages, through the hydrostatic sterilizer at substantially the same processing time and temperature as that of said passing the preheated first packages step, and thereby sterilizing the products sealed in the second packages.

51. A packaged product sterilizing process, said process comprising the steps of:
  preheating a plurality of first packages, each containing at least one thermally-treatable product, in a preheat vessel;
  passing the preheated first packages through a hydrostatic sterilizer and thereby sterilizing the products in the first packages; and
  after said passing the first packages step, passing a plurality of second packages, each containing at least one thermally-treatable product having different initial sterilization processing requirements than those products of the first packages, through the hydrostatic sterilizer at substantially the same processing time and temperature as that of said passing the preheated first packages step, and thereby sterilizing the products in the second packages.

52. A packaged product sterilizing process, said process comprising the steps of:
  preheating a plurality of first packages, each containing at least one thermally-treatable product, in a preheat vessel;
  passing the preheated first packages through a hydrostatic sterilizer and thereby sterilizing the products in the first packages; and
  before said passing the second packages step, passing a plurality of second packages, each containing at least one thermally-treatable product having different initial sterilization processing requirements than those products of the first packages, through the hydrostatic sterilizer at substantially the same processing time and temperature as that of said passing the preheated first packages step, and thereby sterilizing the products in the second packages.

53. A contained food products sterilizing process, said process comprising the steps of:
  preheating a plurality of first containers, each containing at least one thermally-treatable food product, in a preheat vessel;
  passing the preheated first containers through a hydrostatic sterilizer and thereby sterilizing the products in the first containers; and
  passing a plurality of second different containers, each containing at least one thermally-treatable product having different initial sterilization processing requirements than those products of the first containers, through the hydrostatic sterilizer at substantially the same processing time and temperature as that of said passing the preheated first containers step, and thereby sterilizing the products in the second containers;
  wherein both the first and second containers are disposed one outside of the other during said passing steps.

54. The process of claim 53 further comprising, before said preheating the first containers step, sealing the first containers closed.

55. The process of claim 53 further comprising, before said passing the second containers step, sealing the second containers closed.

56. The process of claim 53 further comprising, directly after the first and second containers exit the hydrostatic sterilizer following their said passing steps, directing them to different spaced locations.

* * * * *